United States Patent [19]
Nitta

[11] Patent Number: 5,508,751
[45] Date of Patent: Apr. 16, 1996

[54] RECURSIVE NOISE REDUCTION DEVICE FOR REDUCING NOISE OF STATIONARY REGIONS IN MOVING IMAGES

[75] Inventor: Keiichi Nitta, Tokyo, Japan

[73] Assignee: Nikon Corporation, Tokyo, Japan

[21] Appl. No.: 355,342

[22] Filed: Dec. 12, 1994

[30] Foreign Application Priority Data

Dec. 10, 1993 [JP] Japan ................... 5-341026

[51] Int. Cl.$^6$ ................................. H04N 5/213
[52] U.S. Cl. .............................. 348/607; 348/620
[58] Field of Search .................. 348/607, 714, 348/715, 620, 623, 618, 621, 622, 624, 909; 358/167, 36; H04N 5/21, 5/213, 5/217

[56] References Cited

U.S. PATENT DOCUMENTS

| | | | |
|---|---|---|---|
| 4,296,436 | 10/1981 | Achiha | 348/620 |
| 4,352,126 | 9/1982 | Poncin | 348/620 |
| 4,485,403 | 11/1984 | Illetschko | 358/167 |
| 4,581,642 | 4/1986 | Poetsch | 348/620 |
| 4,639,783 | 1/1987 | Fling | 348/620 |
| 4,646,138 | 2/1987 | Willis | 348/620 |
| 5,025,312 | 6/1991 | Faroudja | 348/620 |
| 5,140,424 | 8/1992 | Yoshimura | 348/607 |

FOREIGN PATENT DOCUMENTS

| | | |
|---|---|---|
| 59-17580 | 4/1984 | Japan . |
| 1-114168 | 5/1989 | Japan . |
| 3-117274 | 5/1991 | Japan . |
| 4-37264 | 2/1992 | Japan . |
| 4-139968 | 5/1992 | Japan . |
| 4-354272 | 12/1992 | Japan . |
| 5-344390 | 12/1993 | Japan . |

OTHER PUBLICATIONS

U.S. Ser. No. 08/062,768 filing date May 18, 1993 Keiichi Nitta assignee Nikon Corporation.
U.S. Ser. No. 08/356,129 filing date Dec. 15, 1994 Nitta assignee Nikon Corporation.

*Primary Examiner*—James J. Groody
*Assistant Examiner*—Sherrie Hsia

[57] ABSTRACT

A recursive noise reduction device which reduces the noise component(s) of stationary region(s) in a moving image, successively cyclically calculating the coefficient (K) times of the present image signals and (1–K) times of the previous image signal having a correlation with the present image signal. The present image signal is a signal of an image of a frame or field that is presently entered and the previous image signal is a signal of an immediately previous image of the frame or field. The recursive noise reduction device includes a calculating unit to recursively calculate a sum of the coefficient K times the present image signal and (1–K) times the previous image signal, modifying the value of the aforementioned coefficient K according to the number of times of cyclic calculation, and a movement detection unit to detect the movement of an image within the stationary region(s) of the image. The value of the coefficient K is modified according to the output signal of the movement detection unit. Preferably, in the case that movement is detected by the movement detection unit, the value of the coefficient K is made equal to 1 as regards only the movement region of the image, and after this, the value of K is gradually made smaller.

10 Claims, 2 Drawing Sheets

RECURSIVE NOISE REDUCTION DEVICE FOR REDUCING NOISE OF STATIONARY REGIONS IN MOVING IMAGES

BACKGROUND OF THE INVENTION

1. Field of the Invention

The present invention relates to a recursive noise reduction device, and more particularly, to a recursive noise reduction device used to reduce noise of stationary regions in moving images.

2. Description of the Related Art

A common recursive noise reduction filter is a device that reduces the noise of a digital image while performing a recursive addition computation. A recursive addition computation is known to perform the addition of a current image multiplied by a constant K and the result of the previous recursive addition computation multiplied by (1 - K). The image of a frame (or the field) that is presently entered is present image $A_{n+1}$ and that the immediate past image, the image of a frame (or the field) before the present image is $A_n$. The image of the frame (or the field) before the immediate past image is $A_{n-1}$. At this time, the equation for the result of the previous recursive addition computation $B_n$ is as follows: $B_n=(K \times A_n)+[(1-K) \times (B_{n-1})]$. In this equation, $B_{n-1}$ is the result of the previous recursive addition computation which was performed before the last one. If K=1 in the results $B_n$ of the previous recursive addition computation, then $B_n=A_n$. Consequently, results $B_n$ of the previous recursive addition computation has a correlation with the immediate past image $A_n$.

One conventional kind of a recursive noise reduction device is shown, for example, in FIG. 4. In this Figure, image signals input from an image terminal 41 are multiplied by a value K ($0 \leq K \leq 1$) by using a multiplier 410. The output of the multiplier 410 passes through an adder 412 and is then output from an output terminal 46, as well as being stored in a memory 43.

Moreover, past signals having a correlation with the image signals input from the input terminal 41 are extracted from the memory 43 and are multiplied by a value (1−K) by a multiplier 411, and multiplied signals from multiplier 411 are added by the adder 412 to the output signals of the multiplier 410. The result is output from the output terminal 46 and simultaneously is again stored in the memory 43. Moreover, the value of the coefficient K is fixedly set according to the amount of the noise components.

Generally, in stationary images, because the noise of the same image is uncorrelated between each frame, reduction of the noise components of the image signals is performed by repeating the above-mentioned operation.

The relationship of the input image signals x and the output image signals y is shown by the following equation (Equation 1). In this instance, x' is the output signal of the memory 43.

$$y=Kx+(1-K)x' \quad \text{(Equation 1)}$$

Modifying Equation 1 by setting 1−K=s, it becomes the following equation (Equation 2):

$$y=x-s(x-x') \quad \text{(Equation 2)}$$

FIG. 5 shows a circuit in which Equation 2 is realized. In the circuit of FIG. 5, the second term of Equation 2, i.e., (x−x'), is effected by the adder 510, and by using a Look Up Table (LUT) stored in a ROM 512, s times this is calculated. Furthermore, the result, s(x−x'), is subtracted from the input image signal by adder 511, and is stored in the memory 53. Moreover, this circuit is well known from Japanese Examined Patent Publication 59-17580.

On the other hand, in contrast to such a prior art noise reduction device, the present inventor initially proposed a device which performed a gradual reduction (1/n) of the value of K according to the number n of cyclic calculations, making the amplitude of the noise of the output image signals $1/\sqrt{\sqrt{n}}$, and which is able to perform a more effective reduction of noise (Japanese Patera Application 4-176019).

The prior art noise reduction device is one which sets the value of the coefficient K as a fixed value. In this kind of prior art device, namely when the value of K is large, for one with a fast convergence of the degree of noise reduction, the convergence value does not become small. Vice versa, when the value of K is small, for one whose convergence value of the degree of noise reduction becomes small, the convergence becomes slow in a stage in which the number of times of cyclic additions is small. In the device proposed by the inventor, the value of K is made large, and in addition, for the number of times of cyclic additions becoming large, by gradually making the value of K smaller, a device is realized in which the convergence of the degree of noise reduction is fast and also the convergence value is small.

Nevertheless, in such a device previously proposed by the present inventor, for a region in which standstill is continuing, noise reduction is rapid and its effect is large. However, the problem is that for regions in which there is movement in the image, particularly after the value of K has become small, hardly any effect of noise reduction is obtained for regions in which there has been movement of the image.

SUMMARY OF THE INVENTION

Accordingly, it is an object of the present invention to solve the aforementioned problems in reducing noise in the image.

It is a further object of the present invention to provide a recursive noise reduction device which is able to perform effective reduction of noise, namely, the noise corresponding to movement of the subject or the camera.

Additional objects and advantages of the invention will be set forth in part in the description which follows, and, in part, will be obvious from the description, or may be learned by practice of the invention.

The foregoing and other objects of the present invention are achieved by providing a recursive noise reduction device for reducing noise in a present image represented by a present image signal, comprising:

a memory unit to store a previous image having a correlation with the present image and represented by a previous image signal;

a calculating unit to recursively calculate a sum of a coefficient K times the present image signal and (1-K) times the previous image signal;

a movement detection unit to detect movement in the present image, and in response, generating a movement detection signal; and the calculating unit decreasing a value of K corresponding to a number of times the calculating unit calculates this sum, and based upon the movement detection signal.

Moreover, the movement detection unit detects a stationary region in the present image where no movement occurs and a movement region in the present image where movement occurs; and the calculating unit makes the value of K equal to I in an initial cycle to determine the sum in the movement region and then in subsequent cycles continuously decreases the value of K to determine the sum in the movement region.

Furthermore, the movement detection unit detects movement for the whole of the present image; and the calculating unit makes the value of K equal to 1 in an initial cycle to determine the sum for the whole present image and then in subsequent cycles continuously makes the value of K smaller to determine the sum in the whole present image.

In the embodiments of the present invention, constituted in this manner, the value of K is made adjustable in a recursive calculation, in a manner similar to that of the previously mentioned Japanese Patent Application 4-176019. In stages in which the number of calculation cycles is small, the value of K is made large, hastening the convergence of the degree of noise reduction. When the number of calculation cycles become large, by making the value of K small, making the convergence value of the degree of noise reduction small is a possibility. Furthermore, in embodiments of the present invention, the value of K is changed based on the detection signal from the movement detection unit which detects the movement of the subject or the camera.

Namely, in the case that there is movement in the image (caused by movement of either the subject or the camera), once the value of K is made large (for example, K = 1), successive K values are made smaller. By doing this, even in the case that there is movement in the image, it is possible to provide for a more effective reduction of noise.

Furthermore, with regard only to the region in which movement is detected by the movement detection unit, once the value of K has been taken as 1, successive values of K are made smaller. As a result, for a region in which there is no movement, convergence is quickly moved to a small convergence value, and effective noise reduction is provided. In addition, for a region in which there is movement, convergence can be hastened.

In this manner, regions in which there is movement and regions in which there is no movement are divided and efficient reduction of noise can be provided. Even in the case of an image which had moved and has become stationary, such as a region which continues to be stationary, efficient noise reduction can be performed.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
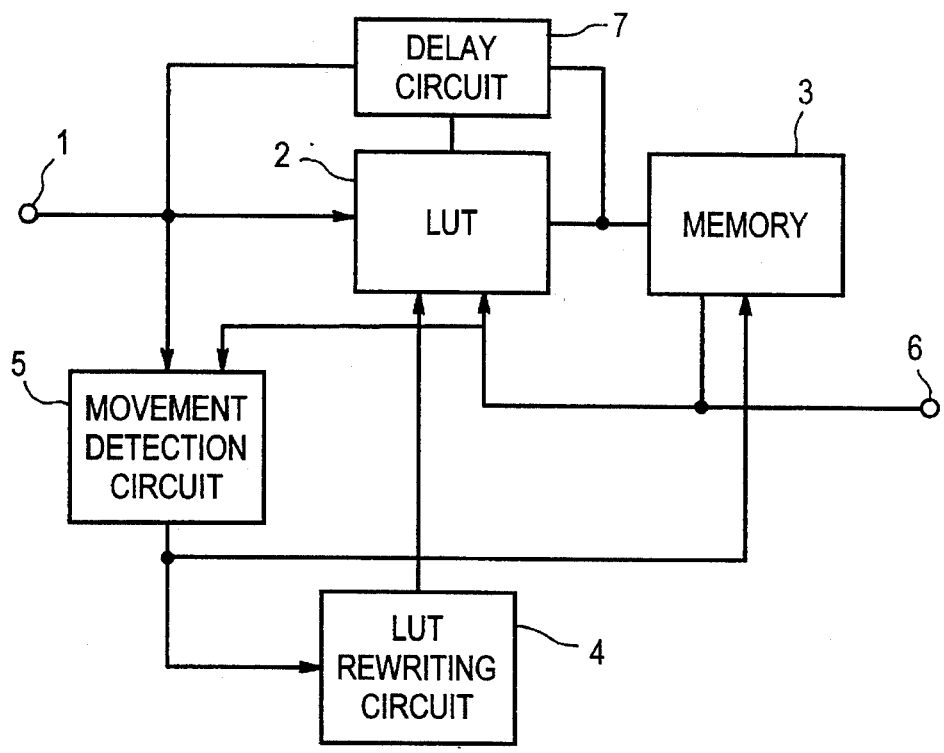
FIG. 1 is a block diagram showing a recursive noise reduction device according to a first embodiment of the present invention.

Reference will now be made in detail to the present preferred embodiments of the present invention, examples of which are illustrated in the accompanying drawings, wherein like reference numerals refer to like elements throughout.

FIG. 1 is a block diagram showing a recursive noise reduction device according to a first embodiment of the present invention. The recursive noise reduction device is equipped with an input terminal 1, a Look Up Table (LUT) 2, a memory 3, an LUT rewriting circuit 4, a movement detection circuit 5, an output terminal 6, and a delay circuit 7.

Image signals from the input terminal 1 are input, together with data output from the memory 3, into the LUT 2. The LUT 2 comprises, for example, rewritable memory elements (RAM).

Figure 5:
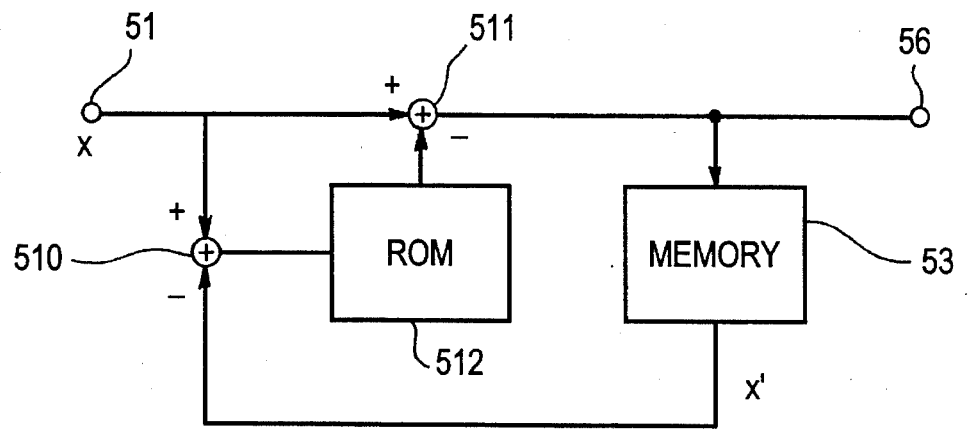
FIG. 5 is a block diagram showing another conventional recursive noise reduction device.

The movement detection circuit 5 compares past images, such as those from the adder 510 shown in FIG. 5, and present images. This difference, in the case that it is larger than some predetermined value, determines that there is movement. Moreover, the movement detection circuit 5 is one which detects movement of the image (subject or camera) with every pixel. However, by performing integration of the difference (difference of the past image and the present image) for a whole frame or field, the movement detection circuit 5 may detect the movement of the whole image based upon the integration value.

In the case that the movement detection circuit 5 determines there is no movement, as performed in each unit period (frame or field) or each integral number of times of the unit period, the contents of the LUT 2 are rewritten by the LUT rewriting circuit 4 in succession such that the value of K is gradually made smaller.

On the other hand, in the case that it has been determined by the movement detection circuit 5 that there is movement, it is unnecessary to display insignificant images (insignificant images referring to the images calculated in recursive addition using the value of K when there is no movement). Output terminal 6 of FIG. 1 is connected with a D/A converter, not shown in the drawing, and this D/A converter is connected to a display device such as a monitor. In order to prevent the showing of the insignificant images on the monitor, the recursive type noise reduction device must stop updating the value of K in order to write to the memory 3. This is done in order to stop the recursive addition computation (updating of the value of K means updating the value of K which was obtained prior to the detection of movement of images by further decreasing it). Because the recursive addition computation is stopped, the data from output terminal 6 is not updated. Subsequently, the data on the display monitor becomes frozen. Then, the LUT rewriting circuit 4 rewrites the content of LUT 2 to K=1. As a result of this rewriting operation, recursive addition computation will be executed, using a new value for K, for the images with movement and the future recursive addition computation. In the step of rewriting the content of LUT 2, because the value of K=1, the result of the recursive addition computation is the same as the data for the current image signals. However, in the results of the recursive addition computation, time has elapsed for the period of recursive addition computation. The input image signal, when it has passed through the LUT 2 and through the equal delay circuit 7, is output unchanged from the output terminal 6. The equal delay circuit 7 has a delay time that is equivalent to the recursive addition computation time. It should be noted that the delay circuit 7 may be substituted with the step of delaying the input signal by a length of time equal to the recursive addition computation time.

Then, after this, the contents of the LUT 2 are rewritten by the rewriting circuit 4 such that K=½, the freezing of the output picture plane is cancelled, and predetermined calculations are performed. The later succeeding values of K become smaller.

If the movement detection circuit 5 detects the movement of the whole image (for a whole frame or field), the rewriting circuit 4 will rewrite the contents of the LUT 2 to change the value of K.

Figure 2:
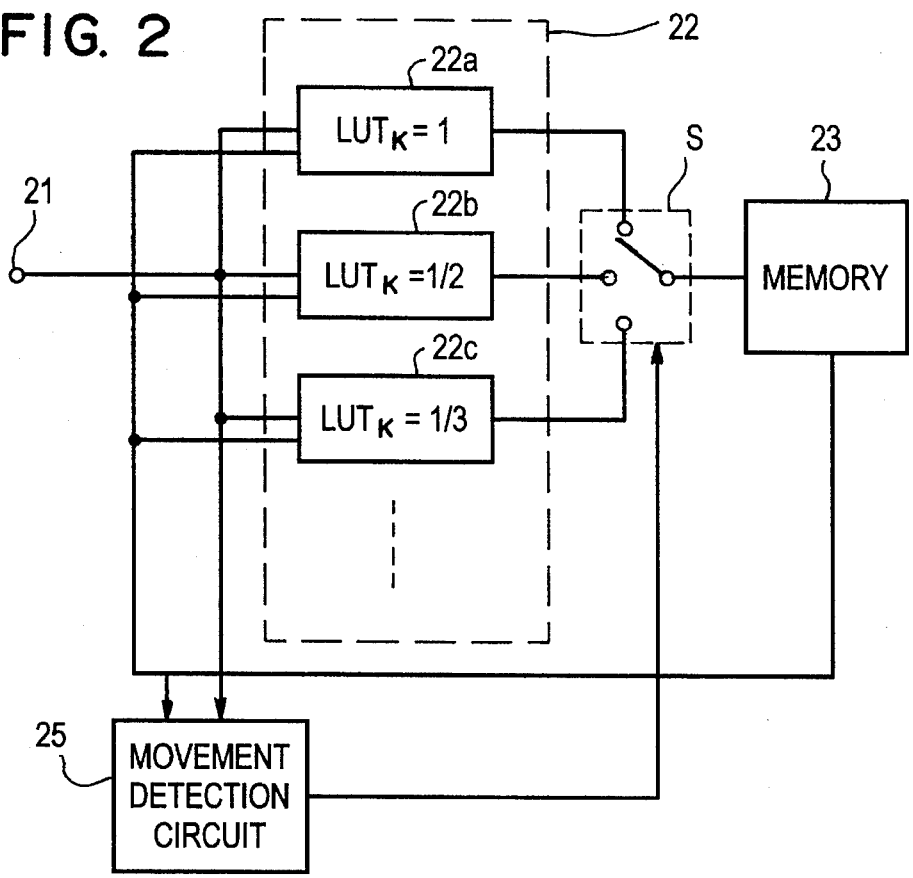
FIG. 2 is a block diagram showing a recursive noise reduction device according to a second embodiment of the present invention.

FIG. 2 is a block diagram showing a recursive noise reduction device according to a second embodiment of the present invention. The recursive noise reduction device shown in FIG. 2 is equipped with an input terminal 21, an LUT 22, memory 23, changeover switch S, and movement detection circuit 25. The LUT 22 is in fact plural LUTs 22a, 22b and 22c. These LUTs 22a, 22b and 22c respectively relate to K=1, K=½ and K= ⅓, which are selectively connected to the memory 23 by the changeover switch S as described later.

The movement detection circuit 25, in a manner similar to that of the movement detection circuit 5 of FIG. 1, compares the past image and the present image and calculates a difference. It determines that there is movement in the case that this difference is greater than some predetermined value, and outputs a signal to the changeover switch S.

An image signal input from the input terminal 21 is respectively input to LUTs 22a, 22b and 22c. Moreover, an output from the memory 23 is simultaneously input to the LUTs 22a, 22b and 22c.

When there is in no noise reduction state, LUT 22a is selected by the changeover switch S. When the noise reduction operation begins, LUTs 22b and 22c are selected n sequence by the changeover switch S, and the value of K is made smaller. But in the device of this embodiment, as mentioned above, the difference of the image data is detected in each pixel, and in the case that this is greater than the predetermined value, it is determined that there is movement.

Figure 3:
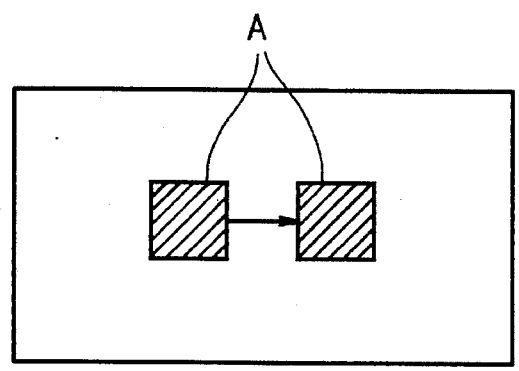
FIG. 3 is a typical diagram describing the operation of the recursive noise reduction device shown in FIG. 2.
Figure 4:
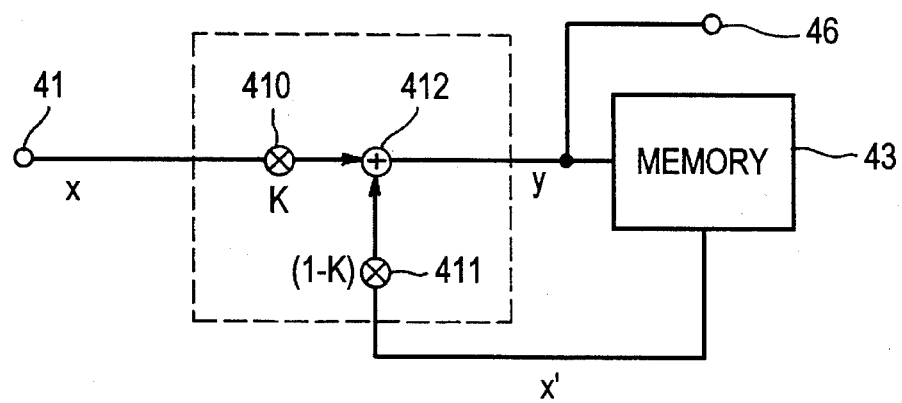
FIG. 4 is a block diagram showing a conventional recursive noise reduction device.

Here, when K=½ is selected, as shown in FIG. 3, wherein Subject A is the one that has moved, a movement detection signal is output from the movement detection circuit 25 with regard to only the region A of the shaded portion referred to as a movement region. With regard to a region for which no movement signal is output from the movement detection circuit 25, referred to as a stationary region, in the next frame, LUT 22c (K=⅓) is selected by the switch S for only the portion which corresponds to this stationary region.

On the other hand, with regard to the movement region A, at the point in time when the movement detection signal has been detected, LUT 22a (K=1) is selected. In the frame(s) or field(s) thereafter, LUT 22b (K=½), LUT 22c (K=⅓) are successively selected by the changeover switch S such that the value of K is gradually made smaller.

In this manner, in the recursive noise reduction device of FIG. 2, regions in which there is movement and regions in which there is no movement are divided and cyclic calculations are performed. Because of this, different values of K, even in the case that an image which was moving has come to a standstill, as regards the region noise reduction, is performed similarly to regions in which standstill is continuing. Therefore, it becomes possible to provide for the effective reduction of noise as a whole.

Moreover, in this embodiment, the LUT 22 comprises three LUT elements (22a, 22b and 22c), but the number of LUTs is not limited to this, and of course a greater number may be used. Further, K=⅓ in LUT 22c, but K may be a different value. Still further, the delay circuit 7 of FIG. 1 may be substituted with the LUT 22a (K=1).

With the embodiments of the present invention as described hereinabove, a recursive noise reduction device can be realized which can perform effective reduction of noise, in a moving image, which corresponds to the movement of the subject and/or the camera. Also, the plural LUTs 22a, 22b and 22c and changeover switch S may be performed by a single unit, for example, a memory. In this instance, data of K=1, ½, ⅓, . . . are stored in the memory 23, and the movement detection signal is input directly from the movement detection circuit 25 to the memory 23.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recursive noise reduction device for reducing noise in a present image represented by a present image signal, comprising:

a memory unit to store a previous image having a correlation with the present image and represented by a previous image signal;

a calculating unit to recursively calculate a sum of a coefficient K times the present image signal and (1−K) times the previous image signal, the value of K being in the range from 0 to 1; and a movement detection unit to detect movement in the present image, and in response, generating a movement detection signal;

said calculating unit continuously decreasing the value of K corresponding to a number of times said calculating unit calculates the sum, and changing the value of K based upon the movement detection signal.

2. The recursive noise reduction device as claimed in claim 1, wherein:

said movement detection unit detects a stationary region in the present image where no movement occurs and a movement region in the present image where movement occurs; and said calculating unit makes the value of K equal to 1 in an initial cycle to determine the sum in the movement region and then in subsequent cycles continuously decreases the value of K to determine the sum in the movement region.

3. The recursive noise reduction device as claimed in claim 1, wherein:

said movement detection unit detects movement for the whole of the present image; and said calculating unit makes the value of K equal to 1 in an initial cycle to determine the sum for the whole present image and then in subsequent cycles continuously makes the value of K smaller to determine the sum in the whole present image.

4. The recursive noise reduction device as claimed in claim 1, wherein said calculating unit makes the value of K different from 1 in an initial cycle to determine the sum when said movement detection unit does not detect movement in the present image, and then in subsequent cycles, continuously decreases the value of K corresponding to the number of times said calculating unit calculates the sum, to determine the sum for the whole present image.

5. The recursive noise reduction device as claimed in claim 2, wherein said calculating unit makes the value of K different from 1 in the initial cycle to determine the sum when said movement detection unit does not detect movement in the present image, and then in the subsequent cycles, continuously decreases the value of K corresponding to the number of times said calculating unit calculates the sum, to determine the sum.

6. The recursive noise reduction device as claimed in claim 3, wherein said calculating unit makes the value of K different from 1 in the initial cycle to determine the sum when said movement detection unit does not detect movement in the present image, and then in the subsequent cycles, continuously decreases the value of K corresponding to the number of times said calculating unit calculates the sum, to determine the sum for the whole present image.

7. The recursive noise reduction device as claimed in claim 1, wherein said movement detection unit detects the movement in the present image by comparing the present image with the previous image.

8. The recursive noise reduction device as claimed in claim 1, wherein said memory unit stores the sum calculated in said calculating unit and after writing the sum from said calculating unit to said memory unit, said calculating unit stops calculating the sum and changes the value of K.

9. A recursive noise reduction device for reducing noise in a present image represented by a present image signal:

- a memory unit to store a previous image having a correlation with the present image and represented by a previous image signal;
- a calculating unit to recursively calculate a sum of a coefficient K times the present image signal and (1–K) times the previous image signal; and
- a movement detection unit to detect movement in the present image, and in response, generating a movement detection signal;
- wherein said calculating unit continuously decreases a value of K for subsequent cycles based upon a number of times said calculating unit calculates the sum and the movement detection signal when said movement detection unit does not detect the movement in the present image, and upon detecting the movement in the present image, makes the value of K equal to 1 in a next cycle and continuously decreases the value of K in subsequent cycles to the next cycle.

10. A recursive noise reduction device for reducing noise in a present image represented by a present image signal:

- a memory unit to store a previous image having a correlation with the present image and represented by a previous image signal;
- a movement detection unit to detect a stationary region in the present image where no movement occurs, and a movement region in the present image where movement occurs and, in response, generating a movement detection signal; and
- a calculating unit to recursively calculate a first sum of a first coefficient times the present image signal and (1–the first coefficient) times the previous image signal for the stationary region and a second sum of a second coefficient times the present image signal and (1–the second coefficient) times the previous image signal for the movement region;
- wherein said calculating unit makes the value of the first coefficient less than 1 for a first cycle and continuously decreases the value of the first coefficient in subsequent cycles to the first cycle based upon a number of times said calculating unit calculates the first sum for the stationary region, and makes the value of the second coefficient equal to 1 for a second cycle and continuously decreases the value of the second coefficient in subsequent cycles to the second cycle based upon a number of times said calculating unit calculates the second sum and the movement detection signal for the movement region.

\* \* \* \* \*